Aug. 21, 1962 T. J. GILLICK, JR., ETAL 3,050,193
FILTER CARTRIDGE
Filed May 1, 1959
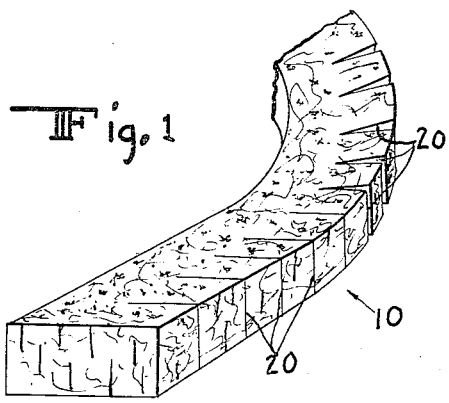
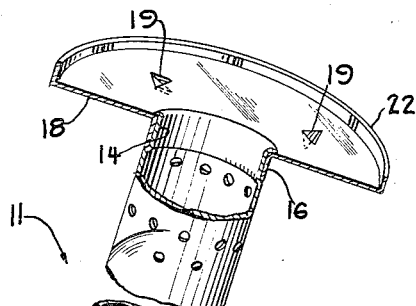
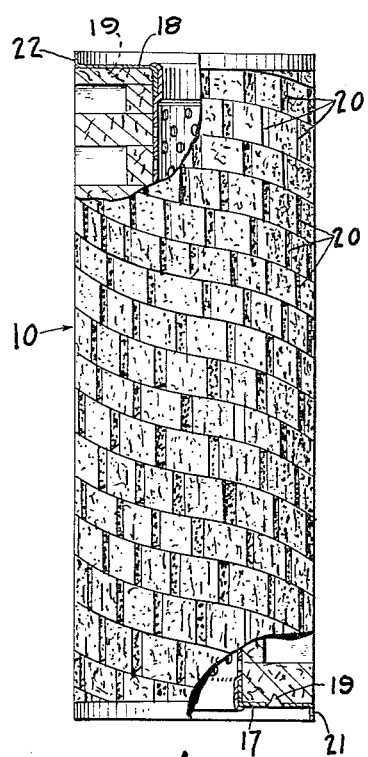
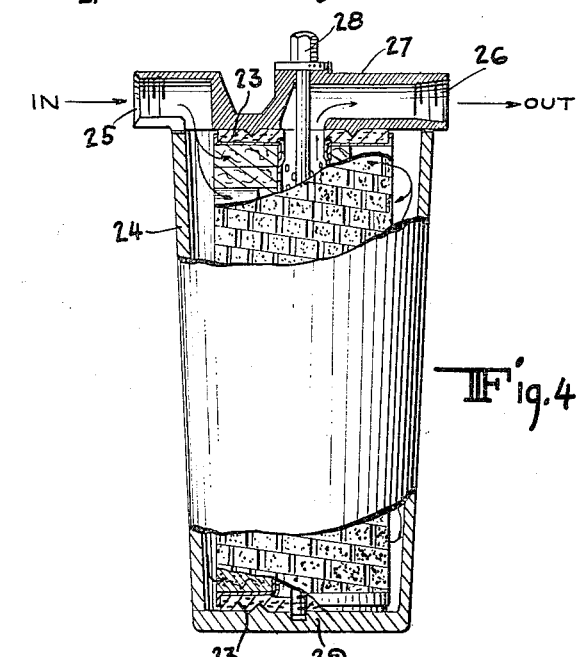
INVENTORS
THOMAS J. GILLICK JR.
HAROLD G. HENGFEN
ARTHUR G. WROTNOWSKI
BY
Pollard Johnston Smythe & Robertson
ATTORNEYS

United States Patent Office 3,050,193
Patented Aug. 21, 1962

3,050,193
FILTER CARTRIDGE
Thomas J. Gillick, Jr., Glenville, and Harold G. Hencken and Arthur C. Wrotnowski, Greenwich, Conn., assignors to American Felt Company, Glenville, Conn., a corporation of Massachusetts
Filed May 1, 1959, Ser. No. 810,456
3 Claims. (Cl. 210—494)

The present invention relates to cartridges for cartridge-type filters, and to the method of making the same.

It has heretofore been proposed to manufacture filter cartridges by supporting a plurality of felt discs on a spool-like member between end discs joined by a foraminous core that passes through central openings of such felt discs. Such filter cartridges, although reasonably satisfactory, have been relatively costly to manufacture and have presented problems in assembly.

An important object of this invention is to provide a disposable filter cartridge having superior filtering capacity and capable of being manufactured at low cost.

Another object of this invention is to provide such a filter cartridge that is made from a single strip of felted material.

Another object of this invention is to provide such a filter cartridge that may include spirally wound convolutions of a continuous strip of filter material.

Another object of this invention is to provide such a filter cartridge in which the felt is made from a material having a predeterminable filtration capacity.

Another object of this invention is to provide such a filter cartridge that will operate successfully at exceptionally low internal pressure differentials.

Another object of this invention is to provide a filter cartridge having a variable density filtering medium so that the filtering action becomes progressively finer from the outer periphery of the filtering medium toward the core of the filter cartridge.

In one aspect of the invention, a spool-like member may include end disc means joined by a foraminous or perforated sleeve. Felt gripping means may be provided on the facing sides of said disc means for effectively holding the opposite ends of a single continuous strip of felt. It has been found that superior results can be achieved with a filter cartridge employing a continuous strip of felt that has its fibers mechanically interlocked by subjecting the batt to a needling operation. This operation may be performed by passing barbed needle means repeatedly through the thickness of the batt in such a manner as to cause the fibers to move in a depthwise direction or transversely of the layers of fibers of the batt. These depthwise or transversely disposed fibers occasioned by the needling process will lie substantially perpendicular to the longitudinal broad faces of the batt. When the barbed needles are withdrawn from the batt, the transversely disposed fibers will remain in their depthwise transverse position, producing a mechanical interlocking of the fibers. The mechanical interlocking may be achieved by subjecting either or both sides of the batt to the needling treatment. Other types of felt can be used.

In another aspect of the invention, the one end of the continuous strip of felt, either the ordinary type or the mechanically interlocked fiber type, may be attached to the gripping means on one of the spool ends. The length of the felt batt may be spirally wound around the foraminous core that connects the spool ends so that succeeding convolutions contact each other over the broad face of the felt strip.

In still another aspect of the invention, parallel cuts extending through the batt thickness and substantially half way through its width may be provided periodically along the one edge of the batt that forms the outer edge of the spiral convolutions. These cuts provide openings at equal intervals over the outer periphery of the spiralled felt, increasing the surface area of the felt and consequently the filtration capacity of the cartridge.

In still another aspect of the invention, the spiralling of the continuous strip of felt about the foraminous core places the fibers of the felt in compression from the core radially outwardly to the neutral axis of the felt strip; and in tension radially outwardly from the neutral axis to the outer periphery of the spiralled felt. Accordingly, the filtering action of the felt becomes progressively finer from the outer periphery of the spiralled felt toward the foraminous core due to the radial varying density of the spiralled felt.

In still another aspect of the invention, the outer faces of the spool ends may support disc gasket means which may vary in thickness. In this way, it is possible to employ a standard length cartridge for filter housings that vary in length by employing a gasket of appropriate thickness.

The above, other objects and novel features of the invention will become apparent from the following specification and accompanying drawings which are merely exemplary.

In the drawings:

FIG. 1 is a perspective view of a felt strip employed in carrying out the principles of the invention;

FIG. 2 is a perspective view of a spool for supporting the felt strip of FIG. 1;

FIG. 3 is a partial sectional elevational view of a filter cartridge formed in accordance with the principles of the invention; and FIG. 4 is a partial sectional elevational view of a complete filter system including a filter housing surrounding a filter cartridge to which the principles of the invention have been applied.

Referring to the drawings, and particularly to FIG. 1, a strip 10 of felt may have a width, length and thickness such that when spirally wound on a spool 11, it will form a cartridge capable of being inserted within a filter housing of the type shown in FIG. 4. It has been found that superior results can be achieved if the strip is made from mechanically interlocked felted synthetic fibers. It will be understood that various combinations of synthetic fibers may be used and that synthetic fibers may be mixed with a minor amount of natural fibers and yet obtain many of the advantages of using synthetic fibers alone.

"Mechanically interlocked" is used herein to mean interlocking the fibers by needling or other similar mechanical processes in which the fibers are mechanically carried depthwise through the felt batt from which they are made. A batt, which can be referred to as a "carded batt," is prepared on a textile carding machine as is known in the manufacture of felt, such providing a plurality of layers of fibers. A plurality of barbed needles are arranged and operated so as to penetrate the thickness of the batt in such a manner as to cause fibers to move in a depthwise direction or across the layers of fiber of the batt. As the needles are withdrawn, the fibers will remain in their depthwise position where they have been carried so as to produce a mechanically interlocked felt. Both sides of the batt can be subjected to the needling treatment a plurality of times.

By employing synthetic fibers, particularly of the monofilament type, the construction will be uniform and it is possible to control accurately the size of pores so that a predetermined size of particles can be filtered out. It is possible to obtain synthetic fibers in a wide range of accurately sized fiber diameters or deniers, such as not obtainable in natural fibers. The preferred form will use monofilament fibers of one denier. The filter cartridge of the present invention has been found to have a very high solids capacity while at the same time maintaining very low pressure differential when in use, and can be designed with fibers of predetermined size to effectively retain particles of a known or desired size.

Referring to FIG. 2, the spool means 11 may include a foraminous tube-like core 12 made from a foraminous paper or other suitable perforated material such as metal. The ends of the core 12 may be necked in at 13 and 14 for receiving the collars 15 and 16 of the spool ends 17 and 18. After the spool ends 17 and 18 are in place, the outer ends of the necked-in portions 13 and 14 may be spun outwardly to the original diameter of the core 12, thereby effectively locking the spool ends 17 and 18 to the ends of the core 12.

The spool ends may be provided with felt gripping means on their facing sides and in the embodiment disclosed, this means comprises a plurality of "struck up" barbs 19, those on each end being struck up toward the other end.

The felt strip 10 of FIG. 1 may be provided with transverse, parallel cuts 20 spaced at equal intervals along its length. The cuts 20 may extend through the thickness of the strip 10 and substantially half way through its width for a purpose to be described later.

The one end of the strip may be fastened to the one spool end by the barbs 19 thereon in a manner such that the cuts 20 face outwardly. The strip 10 may then be spirally wound about the foraminous core 12 with each succeeding convolution in contact with the preceding. The width of the strip 10 may be of any value, and in the embodiment disclosed it is shown as having a width substantially equal to the radial distance from the collar 15 to the outer periphery of the spool end. The thickness of the strip 10 is not critical and may vary within wide limits but necessarily must be such as to facilitate the spiral winding of the strip 10 on the core 12. The length of the strip 10 may be such that when the core 12 is full, the free end of the strip 10 may be wedged between the last convolution and the spool end 18 in a manner to effect a gripping action between the barbs 19 thereon and the one surface of the strip 10.

Referring to FIG. 3, it is apparent that the cuts 20 in the strip 10 open up when the strip is spiralled around the core 12, forming openings that will occur in a staggered relation entirely over the outer peripheral surface of the cartridge, thereby providing an increase in the effective filtering area of the cartridge. Furthermore, the fibers of the felt are placed in compression from the foraminous core radially outwardly to the neutral axis of the spiralled felt. Although the cuts 20 open up when the strip is in place about the core 12, the fibers of the felt radially outwardly from the neutral axis are to a greater or lesser extent in tension, providing a coarser filtering action than the compressed fibers adjacent the core 12.

Referring again to FIG. 2, the spool ends 17 and 18 may be provided with flanges 21 and 22 extending outwardly and forming outwardly facing pockets in each spool end, for the reception of a disc-like gasket 23.

Referring to FIG. 4, an assembled cartridge is shown mounted within a filter housing 24 having an inlet 25 and an outlet 26. The inlet and outlet normally are formed in a removable cap 27 adapted to be held in sealing relation with the gasket 23 and the outer top edge of housing 24 by a headed bolt 28 that extends downwardly through the core 12 and is threaded into the base 29 of the housing 24.

By providing gaskets 23 of different thickness, it is evident that a standard cartridge may be employed with filter housings 24 of varying length. As the liquid to be filtered passes through the inlet 25 it fills the annular space between the cartridge and the housing 24. The liquid then passes through the spiralled felt strip 10, thence through the foraminous core 12 and finally out the outlet 26.

Although the various features of the new and improved filter cartridge have been shown and described in detail to fully disclose one embodiment of the invention, it will be evident that numerous changes may be made in such details and certain features may be used without others without departing from the principles of the invention.

What is claimed is:

1. A filtering cartridge comprising a spool-like element having end members fixed to a perforated cylindrical core; a felt strip of rectangular cross-section and of substantially less thickness than the distance between said end members and having substantially the same porosity throughout, spirally wound about said cylindrical core between said end members in such fashion that succeeding convolutions contact preceding convolutions over substantially the entire width thereof; and spiked means adjacent the facing sides of said end members constituting the sole means for maintaining said felt strip in assembled relation on said core.

2. A filtering cartridge comprising a spool-like element having end members fixed to a perforated cylindrical core, said end members having oppositely disposed flange means adapted to receive gasket means; a felt strip of rectangular cross-section and of substantially less thickness than the distance between said end members and having substantially the same porosity throughout, spirally wound about said cylindrical core between said end members in such fashion that succeeding convolutions contact preceding convolutions over substantially the entire width thereof; and spiked means adjacent the facing sides of said end members constituting the sole means for maintaining said felt strip in assembled relation on said core.

3. A filtering cartridge comprising a spool-like element having end members fixed to a perforated cylindrical core; a felt strip of rectangular cross-section and of substantially less thickness than the distance between said end members, having spaced transverse cuts extending partially transversely therethrough, and having substantially the same porosity throughout, spirally wound about said cylindrical core between said end members in such fashion that succeeding convolutions contact preceding convolutions over substantially the entire width thereof; and spiked means adjacent the facing sides of said end members constituting the sole means for maintaining said felt strip in assembled relation on said core.

References Cited in the file of this patent

UNITED STATES PATENTS

| 1,942,952 | Baxenden | Jan. 9, 1934 |
| 2,134,601 | Campbell | Oct. 25, 1938 |
| 2,421,704 | Kasten | June 3, 1947 |
| 2,550,853 | Nugent | May 1, 1951 |
| 2,732,077 | Robinson | Jan. 24, 1956 |
| 2,742,160 | Fogwell | Apr. 17, 1956 |
| 2,781,913 | Thompson | Feb. 19, 1957 |
| 2,819,800 | Goodloe | Jan. 14, 1958 |

FOREIGN PATENTS

| 502,000 | Canada | May 4, 1954 |

OTHER REFERENCES

Dupont Information Bulletin x-64, January 1957, 10 pages.